United States Patent
Kim

(10) Patent No.: US 9,497,381 B2
(45) Date of Patent: Nov. 15, 2016

(54) SIGNAL PROCESSING CIRCUIT WITH MULTIPLE POWER MODES

(71) Applicant: Wisconsin Alumni Research Foundation, Madison, WI (US)

(72) Inventor: Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 9 days.

(21) Appl. No.: 14/596,565

(22) Filed: Jan. 14, 2015

(65) Prior Publication Data

US 2016/0205321 A1    Jul. 14, 2016

(51) Int. Cl.
*H04N 5/225* (2006.01)
*H04N 5/232* (2006.01)

(52) U.S. Cl.
CPC ...... *H04N 5/23241* (2013.01); *H04N 5/23245* (2013.01); *H04N 5/23293* (2013.01)

(58) Field of Classification Search
CPC .............. H04N 5/23241; H04N 5/23293; H04N 5/23245
USPC .............. 348/222.1, 220.1, 372–376
See application file for complete search history.

(56) References Cited

U.S. PATENT DOCUMENTS

| 8,446,484 B2* | 5/2013 | Muukki | G06T 3/4015 |
| | | | 348/222.1 |
| 2013/0215286 A1* | 8/2013 | Ohya | H04N 5/37455 |
| | | | 348/222.1 |

* cited by examiner

*Primary Examiner* — Yogesh Aggarwal
(74) *Attorney, Agent, or Firm* — Boyle Fredrickson, S.C.

(57) ABSTRACT

A signal processing circuit, for example, an image signal processor, is operated in two modes including a first mode for providing output optimized for human perception and a second mode providing output optimized for feature detection where the image signal processor in the second mode provides a degraded output with respect to human perception that nevertheless saves power and provides reliable feature detection.

18 Claims, 5 Drawing Sheets

SIGNAL PROCESSING CIRCUIT WITH MULTIPLE POWER MODES

STATEMENT REGARDING FEDERALLY SPONSORED RESEARCH OR DEVELOPMENT

This invention was made with government support under 0953603 awarded by the National Science Foundation. The government has certain rights in the invention.

CROSS REFERENCE TO RELATED APPLICATION

Background of the Invention

The present invention relates to circuits for signal processing, such as image signal processors (ISPs), and in particular to a signal processor operating in multiple modes to provide energy savings.

Image signal processors are specialized circuits frequently found in cameras to provide rapid processing of image data, for example, providing: white balance, gamma correction, format processing, geometric correction and demosaicing. Each of these image processing functions optimizes the image data for the human eyes perception. Thus, for example, gamma correction addresses the decreasing sensitive of the human eye to differences in tones as one moves to lighter tones.

The image processing functions of the image signal processor are normally implemented in pipelined fashion, with the image data passing through separate function blocks operating in series on the image data. The resulting processed image data is normally output on a multicolor display such as a liquid crystal display (LCD) or organic LED display (OLED).

The increasing availability of camera capabilities in mobile devices, such as in cell phones and the like, have given rise to new applications in which image data is acquired for purposes other than picture-taking. For example, a camera may be used to recognize the user of the mobile device and to unlock features of the device, or the camera may be used as an input device to recognize gestures by the user.

For these newly developing applications, the ISP may be teamed with additional hardware beyond the LCD display, such as dedicated circuitry or algorithm running on a general-purpose processor for extracting characteristics of the face or a given gesture.

These new camera-based applications often require that the ISP operate for an extended period of time. The power consumed by the ISP when operating for an extended period of time can tax the capacity of current electrical storage batteries associated with mobile devices.

SUMMARY OF THE INVENTION

The present inventor has recognized that the task of optimizing an image for human perception may not align with the requirements of feature detection circuitry (for example, used for face recognition). Accordingly the present invention provides a signal processing system that may operate in at least two modes, one mode optimizing the signal for human vision and the other mode optimizing the signal for feature detection where this latter mode provides reduced power consumption. Generally the feature detection mode may operate with a perception-degraded image that conserves power. This is particularly the case if the feature detection is trained using perception-degraded images.

Specifically then, the present invention provides a signal processing circuit having an input for receiving an input pattern-data array (such as an image) having values and data order significance and a series of processor blocks processing a pattern-data array to provide improved human perception of the pattern-data array. A feature detector is also provided receiving a pattern-data array to identify a predetermined feature in the pattern-data array. A power management circuit receiving a mode command operates: (1) in a first mode, to activate a first set of the processor blocks to process the input pattern-data array to provide a first processed pattern-data array for output on a human machine interface, the first processed pattern-data array offering improved human perception quality on the human machine interface over the input pattern-data array, and (2) in a second mode, to activate a second set of the processor blocks different from the first set to process the input pattern-data array to provide a second processed pattern-data array for processing by the feature detector, the second processed pattern-data array offering reduced human perception quality on the human machine interface compared to the first processed pattern-data array, the second set of processor blocks consuming less power than the first set of processor blocks.

It is thus a feature of at least one embodiment of the invention to exploit the weak correlation between perceptive image quality and feature detection to provide a special feature detection mode that uses lower power by reducing perceptive image quality.

The first and second set of processor blocks may include perception-enhancing circuits enhancing the human perception quality of pattern-data arrays wherein the first set of processor blocks activates more of the perception-enhancing circuits than the second set of processor blocks.

It is thus a feature of at least one embodiment of the invention to permit degradation of perceptive image quality to the extent that it is not necessary for feature detection.

The perception-enhancing circuits of the second set of processor blocks may include perception-enhancing circuits whose deactivation provides greater degradation of operation of the feature detector than the perception-enhancing circuits excluded by the second set of processor blocks.

It is thus a feature of at least one embodiment of the invention to exploit relative differences in perception-enhancing circuits with respect to feature detection and to selectively activate only the most important perception-enhancing circuits.

The power management circuit moves from the first mode to the second mode upon the feature detector detecting a predetermined feature.

It is thus a feature of at least one embodiment of the invention to provide a system that may provide long-term, low-power feature detection then switch to improved perceptive image quality once a feature has been detected.

The pattern-data array may be pixel data of an image acquired from a camera.

It is thus a feature of at least one embodiment of the invention to exploit cameras in battery-powered devices for nontraditional uses while minimizing power consumption.

The pattern-data array may be color pixel data wherein the second set includes a demosaicing perception-enhancing circuit and/or gamma correction.

It is thus a feature of at least one embodiment of the invention to preserve perception-enhancing circuits that also help enhance feature detection during feature detection.

The first set of processor blocks may include a color balance perception-enhancing circuit which is not included in the second set of processor blocks.

It is thus a feature of at least one embodiment of the invention to deactivate perception-enhancing circuits that do not help enhance, feature detection during feature detection.

The processor blocks may include a scaling circuit operating when activated to provide a given downsampling of the pattern-data may before receipt by other processor blocks, and the power management circuit may activate the scaling circuit for the given downsampling only in the second mode.

It is thus a feature of at least one embodiment of the invention to radically reduce the resolution of the image data empirically determined to have relatively slight adverse effect on feature detection.

The signal processing circuit may include an interpolation circuit operating to (1) remove interpolatable data from the pattern-data array before receipt by other processor blocks and (2) re-create the removed interpolatable data in output from the other processor blocks by interpolation of the output from the other processor blocks. The power management circuit may activate the interpolation circuit as a function of being in the second mode.

It is thus a feature of at least one embodiment of the invention to reduce the data necessary to be processed by perception-enhancing circuits while approximating that data for the purposes of feature detection.

The interpolation system may remove interpolatable data as a function of a difference in values of adjacent data to the interpolatable data.

It is thus a feature of at least one embodiment of the invention to eliminate data associated with low gradient changes in the image empirically determined to have relatively low impact on feature detection.

The interpolation circuit may use linear interpolation.

It is thus a feature of at least one embodiment of the invention to provide a rapid interpolation technique that has modest power requirements.

The feature detector may be a supervised machine learning system having weights trained with a training set of pattern-data arrays processed by the second set of processor blocks.

It is thus a feature of at least one embodiment of the invention to train a feature detector with perception-degraded data to further reduce the perception-enhancing energy required for processing pattern-data arrays.

The feature detector may provide a feature-detection output that is a function of feature detection of successive frames of a video stream of pattern-data arrays.

It is thus a feature of at least one embodiment of the invention to accommodate some feature detection errors on an individual frame basis by analyzing multiple flames.

These particular objects and advantages may apply to only some embodiments falling within the claims and thus do not define the scope of the invention.

DETAILED DESCRIPTION OF THE PREFERRED EMBODIMENT

Figure 1:
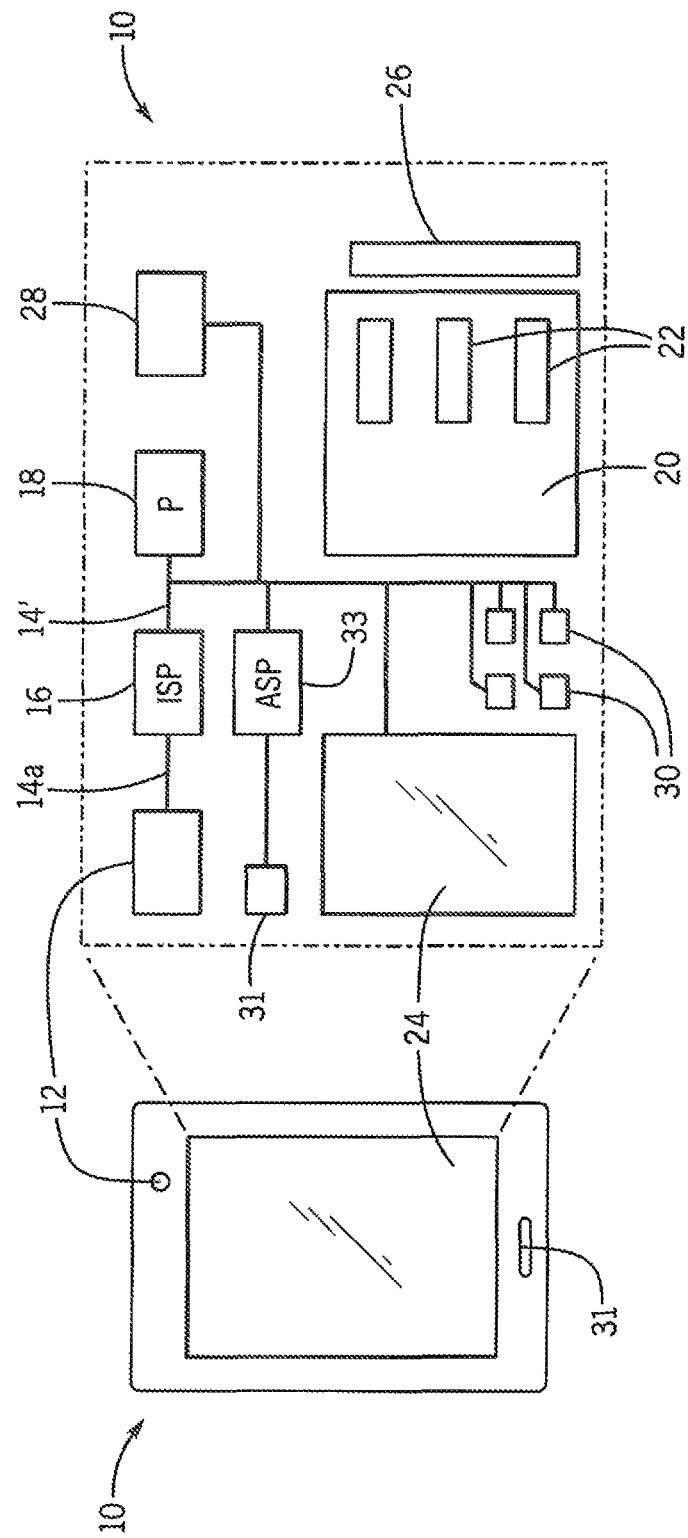
FIG. 1 is a is a block diagram of a smart phone providing an example mobile device suitable for use with the present invention and incorporating a dual-mode image signal processor of the present invention.

Referring now to FIG. 1, a mobile processing device 10 such as a smart phone may provide an electronic camera 12 for collecting image data 14, the latter being generally a "pattern-data array" having values (e.g., pixel brightness and color) with data order significance (e.g., x and y coordinates of pixels within an image). More generally the pattern-data array may be audio or video signals or gesture information.

The image data 14 may be received by an image signal processor (ISP) 16 as will be discussed below, which processes the image data 14 to provide modified image data 14' having better perceptive image quality or view by a human, or having reduced perceptive human quality for feature detection and power savings.

Generally, the ISP 16 may communicate with one or more computer processors 18 of the mobile processing device 10. These processors 18 in turn may communicate with a memory 20 holding stored programs 22 that may be executed by the processors for processing the modified image data 14', for example, to implement a feature detector. Alternatively, the feature detector may be implemented by a dedicated circuit (not shown).

Typically, the modified image data 14' will be displayed on an electronic display, for example, on a touchscreen 24, the latter providing a human machine interface for the mobile processing device 10. As is understood in the art, the touchscreen 24 includes a backlit, high-resolution color LCD display or OLED display and may sense finger or stylus touches on its surface to provide for input by the user of the mobile processing device 10.

Each of the elements of the mobile processing device 10 may be powered by a self-contained battery 26 and the mobile processing device 10 may further include one or more wireless transceivers 28 providing cell phone, Wi-Fi, Bluetooth communication or the like. The mobile processing device 10 may also include one or more sensors 30 providing a variety of different functions including, for example, a magnetometer, accelerometer, barometer, etc. The mobile processing device 10 may further include a microphone 31 and an audio signal processor 33 analogous to the ISP 16 but providing audio related processing blocks for improving the perceptive audio quality of an audio signal.

Figure 2:
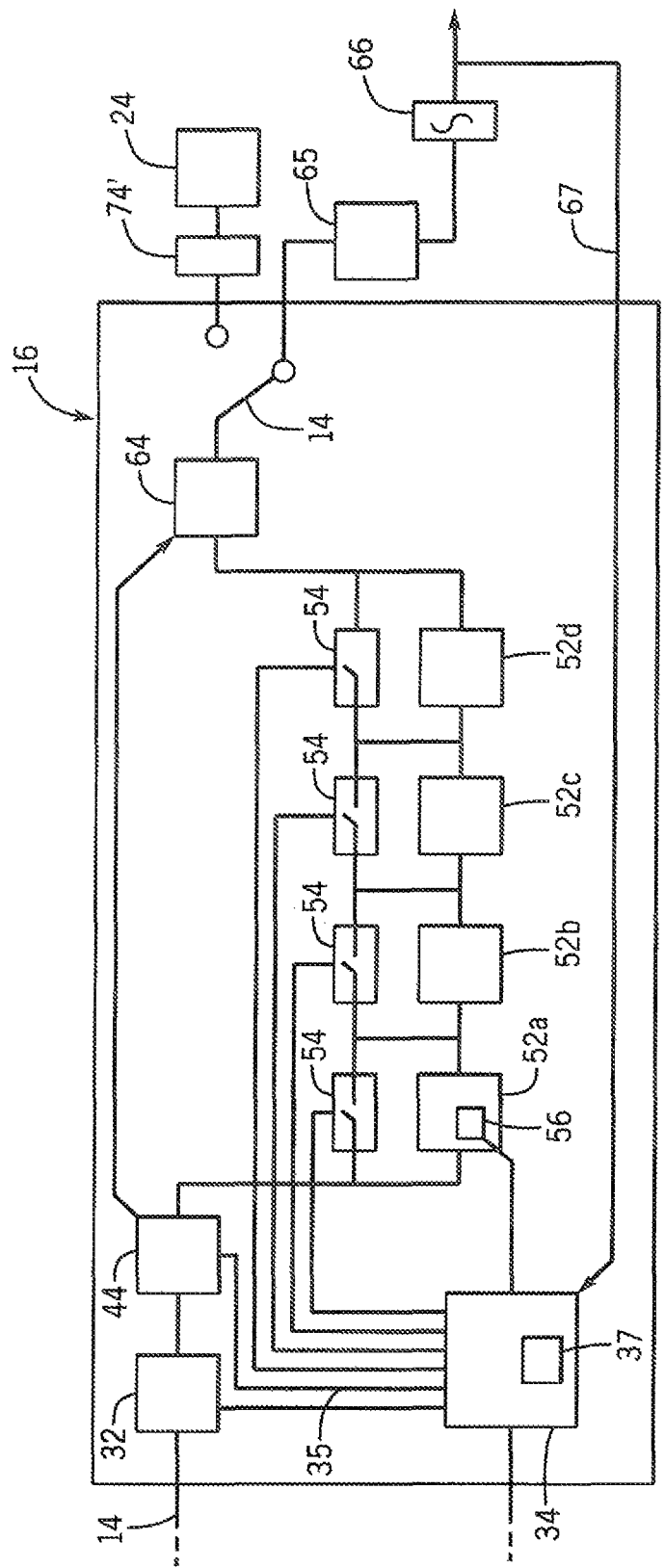
FIG. 2 is an expanded block diagram of the image signal processor showing a power management circuit for controlling multiple processing blocks to change the activation of the process blocks according to intended use of the image data for human directed output or feature detection.
Figure 3:
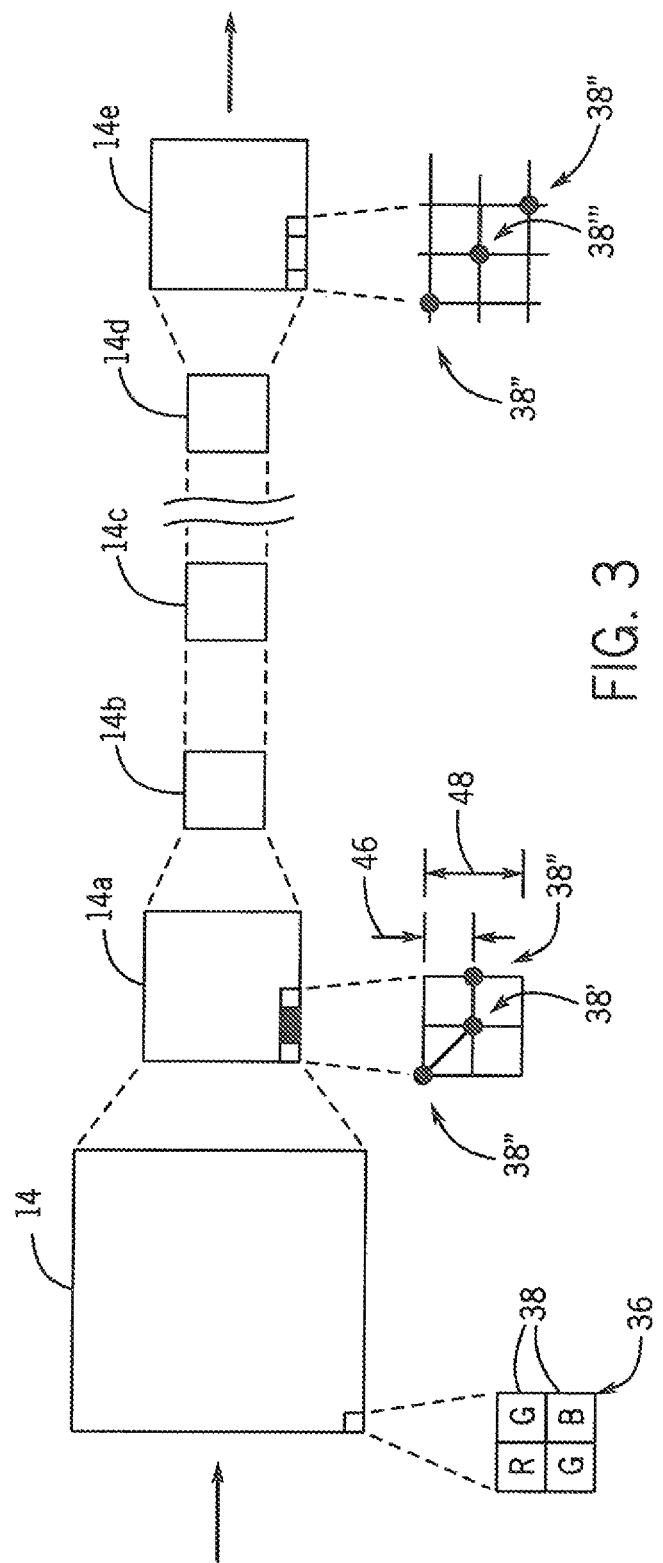
FIG. 3 is a diagrammatic representation of the image data processed in a power saving mode of the image signal processor providing data for feature extraction.
Figure 4:
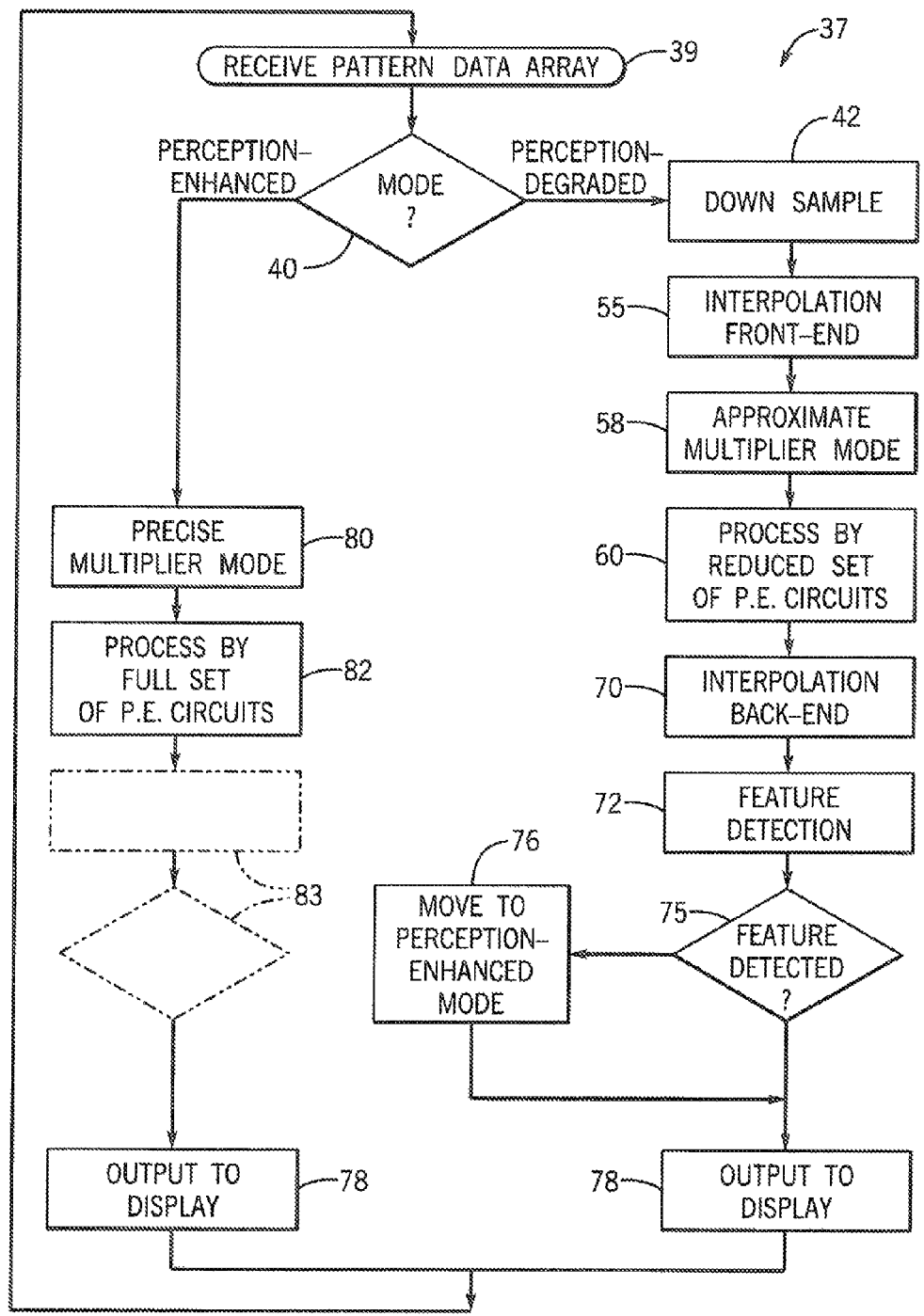
FIG. 4 is a flowchart showing operation of the image signal processor in a first and second mode.

Referring now to FIGS. 2-4, the ISP 16 may provide a power management circuit 34 executing stored program 37 (for example, in firmware) controlling a set of other switchable, signal processor blocks that may be activated or deactivated according to an operating mode by the power management circuit 34. These processor blocks, which will be described below, include a scaler 32, and an interpolator routing interpolation front-end 44 and interpolation back-end 64 and a bank of perception enhancing circuits 52.

As indicated by process block 39 of FIG. 4, the ISP 16 under the guidance of the program 37, may receive image data 14 for processing. The power management circuit 34 may be in either a first or second mode as initialized by the processor 18 executing a stored program 22 according to internal elements of the ISP 16 to be described below.

Generally, the first operating mode of the ISP 16 provides for higher power consumption by the ISP 16 but generates modified image data 14' that has been optimized for human perception. In contrast, the second operating mode of the ISP 16 provides for lower power consumption by the ISP 16 and generates modified image data 14' that provides lower quality human perception but is nevertheless suitable for feature extraction by the feature detector implemented by processor 18 or through the use of a dedicated feature detection circuit.

As shown in FIG. 2, the image data 14 is next received by a scaler 32 which, when activated, may downsample the received image data 14 by a controlled amount determined by a power management circuit 34. For example, as shown in FIG. 3, the image data 14 may comprise a set of RGB (red, green, blue) pixel groups 36 comprised of individual hue pixels 38 each denoting light intensity at given colors such as red, green or blue as detected by the camera 12. The image data 14 may for example, provide for a two-dimensional array of N×N RGB pixel groups 36 being a function of the resolution and format of the camera 12. The scaler 32 may eliminate a predetermined number of these RGB pixel groups 36 uniformly distributed over the area of the two-dimensional array, for example, retaining only every fourth RGB pixel group 36 in a row and column to provide a 4×4 scaling resulting in a two-dimensional array of N/4×N/4 RGB pixel groups 36. When deactivated, the scaler 32 may provide for no downsampling or a lower downsampling under control of the power management circuit 34.

Assuming that the ISP 16 is operating under the power-saving second mode, then as indicated in FIG. 4 at process block 42, the pattern image data 14 is downsampled, for example, by a 4×4 for scaling described above.

The downsampled image data 14a is then received by an interpolation front-end 44 which reviews the hue pixels 38 of each RGB pixel group 36 according to a threshold/percentage level signal 35 received from the power management circuit 34 to remove RGB pixel group 36 according to an assessment of how critical those pixels will be to the feature detection process. The interpolation front-end 44 is active during the second mode to produce interpolation-reduced image data 14b.

Referring to FIG. 3, in one embodiment, the interpolation front-end 44 looks at the values of periodically spaced RGB pixel groups 38' according to the percentage portion of the threshold/percentage level signal 35 from the power management circuit 34 and compares those values to the values of the surrounding RGB pixel groups 38". Generally this process will be conducted in two dimensions but is represented as a single dimension for clarity. In this single dimensional case, each periodically spaced hue pixel 38' has at most two flanking adjacent hue pixels 38". In this case, the interpolation front-end 44 determines a difference value 46 between the flanking hue pixels 38" and removes hue pixels 38' if that difference value 46 is less than the threshold value 48 being part of the threshold/percentage level signal 35. In the case of an RGB pixel group 36, the difference value 46 may be a set of values looking independently at each of the hue pixels 38 and taking the maximum difference of corresponding hue pixels 38 so that every difference value calculated from each hue pixel 38' must be below the threshold value 48.

The resulting interpolation-reduced image data 14b may include shim values indicating where values of RGB pixel group 36 have been removed, or the locations of these removed values may be recorded in another fashion. This removal process is indicated by process block 50 in FIG. 4.

The resulting interpolation-reduced image data 14b is then provided to a set of standard perception-enhancing circuits 52a-52d operating in series. Any of the perception-enhancing circuits 52 may be bypassed by corresponding bypass switches 54 controlled by the power management circuit 34. Generally, the perception-enhancing circuits 52 may include all standard image processing elements such as demosaicing, gamma correction, white balance correction, color correction, edge enhancement, geometric correction, and the like as is understood in the art.

In brief summary of some of these perception-enhancing circuits 52, demosaicing converts each of the RGB pixel groups 38 comprised of separate hue pixels 38 into a single tristimulus value (being a RGB triplet) using any number of interpolation schemes known in the art. Gamma correction provides conversion of brightness values according to a power-law nonlinearity converting the tristimulus pixel values to display values to better comport with the nonlinearities in the human eye. White balance and color balance apply weighting factors to each of the red, green and blue values so that neutral colors are naturally rendered. Geometric correction corrects for lens distortions by applying a reverse distortion mapping.

Some of these perception-enhancing circuits 52 may employ a multiplier circuit 56 which can be switched into a low precision mode using, in the second mode, for example, the invention described in U.S. patent application Ser. No. 14/453,172 filed Aug. 6, 2014, and entitled: Multiplication Circuit Providing Dynamic Truncation, this disclosure hereby incorporated by reference. Generally, the power management circuit 34 controls the accuracy of the multiplication circuits 56 in active perception-enhancing circuits 52 and in the second mode may use a lower accuracy multiplication. This switching of any multiplier circuits 56 to low accuracy is shown by process block 58.

In the second mode, the power management circuit 34 also bypasses a number of the perception-enhancing circuits 52 according to empirical determinations of how important the particular perception-enhancement is for feature detection and the relative power consumption of the perception-enhancing circuit 52. While different architectures will provide for different trade-offs, in one embodiment, the present invention when operating in the second mode preserves gamma correction and demosaicing and deactivates (bypasses) all of the other perception-enhancing circuits 52 including white balance, color balance, and geometric correction.

The activation of this reduced set of perception-enhancing circuits 52 is shown at process block 60 of FIG. 4. As shown in FIG. 3, the activated perception-enhancing circuits 52, operating in series, produced successive processed image data 14c and 14d.

During this processing of the activated perception-enhancing circuits 52, shim values inserted by the interpolation of process block 55 are ignored but may be thought of as preserving the correct spatial relationship of the remaining values of the image data 14a.

At process block 70, the image data 14d output from the final perception-enhancing circuits 52 in the series is received by the interpolation hack-end 64 which identifies the locations of the previously removed sample hue pixels 38 (now a single tristimulus value) and restores them with interpolation hue pixels 38' (also tristimulus values) obtained by linear interpolation from the preserved flanking hue pixels 38″ to create interpolation-increased image data 14e. Although a linear interpolation is shown and is preferred for power consumption reduction, it will be understood more generally that higher ordered interpolation may also be used.

At process block 72, feature detection operating on the interpolation-augmented image data 14e may be conducted, for example, by a specialized circuit or by the processor 18 executing on the programs 22. If a feature is detected, as indicated at decision block 75, then at process block 76 the ISP 16 may switch itself from the low-power, second mode to the high-power, first mode under the assumption that high quality image data will now be required for human viewing or recording.

As shown in FIG. 2, the output of the feature detector 65 may be received by a combiner 66 combining multiple determinations of whether a feature exists in a sequence of image data 14 to provide for more robust feature detection output 67.

Often, the output from interpolation back-end 64 will be channeled solely to a feature detector 65 but this output may also be sent to the display of the touchscreen 24 in the form of the thumbnail or low-resolution guidance image.

Referring still to FIG. 4, if at decision block 40, the ISP 16 is in a first, high quality, high power consumption mode, then the program proceeds to process block 80 and any multipliers of the function perception-enhancing circuits 52 are placed in precision mode which uses greater power but provides for higher precision multiplication. Then at process block 82, a second and typically full set of function perception-enhancing circuits 52 are activated to process the image data 14. In this case the scaler 32, and interpolation front-end 44, are deactivated so that the first perception-enhancing circuit 52a receives the image data 14 without any downscaling or interpolation reduction. Likewise the interpolation back-end 64 is also deactivated.

It will be noted that the resulting high perceptive image quality may be optionally provided to a feature detector as indicated by process blocks 83 if desired. At process block 78 the perception-enhanced pattern data may be output to a human machine interface such as a touchscreen 24 or may be recorded in high-resolution mode.

Figure 5:
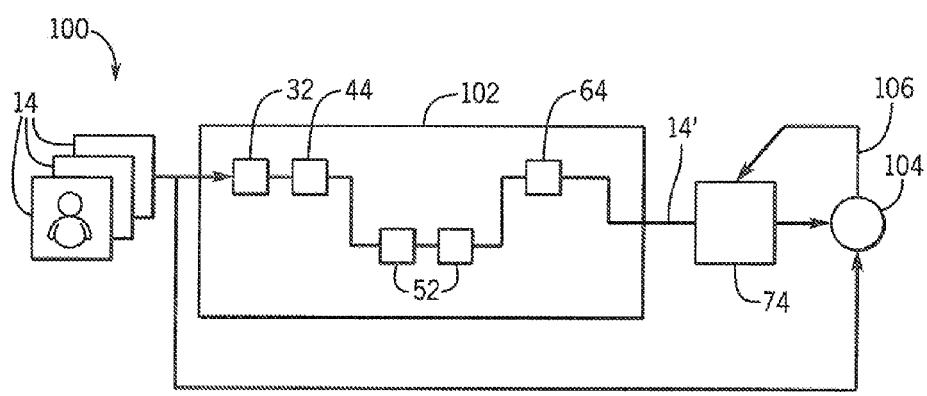
FIG. 5 is a block diagram showing a process of training a feature detector using perception-degraded pattern-data arrays.

Referring now to FIG. 5, in one embodiment, the feature detector 74 may be implemented as a supervised learning machine such as a neural net which is trained using a teaching set 100 to recognize feature such as faces. In this embodiment, the teaching set 100 may include image data 14 representing both images with faces and without faces identified as such, for example, by human observer. This teaching set 100 may then be provided to a signal processor 102 mimicking the perception-degraded signal path of the ISP 16 when operated in the second mode. That is, the signal processor 102 may provide processing by the sealer 32, the interpolation front-end 44, the limited set of function perception-enhancing circuits 52 (for example, just the demosaicing and gamma correction) and the interpolation back-end 64.

The resulting perception-degraded output image data 14 is then provided to a feature detector 74 being trained. As is understood in the art, during such training, the output of the feature detector 74 is compared per comparison block 104 to known qualities of the given teaching image data 14 (for example, whether the image shows or does not show a face) and any errors used to adjust the weightings of the feature detector 74 per feedback path 106. By training the feature detector 74 to the degraded images, improved accuracy may be obtained when the ISP 16 is in the second mode.

It will be understood that the present invention is not limited solely to ISPs or to image processing but may find application in any signal processing circuit processing signals for human perception. For example, a microphone receiving an audio signal may be processed by a signal processor to improve the clarity of that audio signal to a human listener. Such audio processing, for example, may be used when the audio signal is a voice communication signal and may accentuate waveform features that are important for communicating information vocally. In this case, a reduced and more simply processed data stream may be employed for feature detection, for example, recognizing a spoken command from a limited set of commands.

Likewise with respect to gesture signals received from a touchscreen, the input may be processed for high touchscreen location fidelity needed for user viewing, for example, in a drawing program creating a line drawn with a finger touch, whereas a feature detection device may receive a different set of data not optimized for this use.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A signal processing circuit comprising:
   an input for receiving an input pattern-data array having values and data order significance;
   a series of processor blocks processing a pattern-data array to provide improved human perception of the pattern-data array;
   a feature detector receiving a pattern-data array to identify a predetermined feature in the pattern-data array; and
   a power management circuit receiving a mode command and operating:
   (1) in a first mode to activate a first set of the processor blocks to process the input pattern-data array to provide a first processed pattern-data array for output on a human machine interface, the first processed pattern-data array offering improved human perception quality on the human machine interface over the input pattern-data array, and
   (2) in a second mode to activate a second set of the processor blocks different from the first set to process the input pattern-data array to provide a second processed pattern-data array for processing by the feature detector, the second processed pattern-data array offering reduced human perception quality on the human machine interface compared to the first processed pattern-data array, the second set of processor blocks consuming less power than the first set of processor blocks;
   wherein the first and second set of processor blocks include perception-enhancing circuits enhancing the human perception quality of pattern-data arrays and wherein the first set of processor blocks activates more of the perception-enhancing circuits than the second set of processor blocks; and
   wherein the second set of processor blocks operating together provide better accuracy in the feature detector than would be provided by the process blocks excluded from the second set of processor blocks operating together.

2. The signal processing circuit of claim 1 wherein the power management circuit moves from the first mode to the second mode upon the feature detector detecting a predetermined feature.

3. The signal processing circuit of claim 1 further including a human machine interface receiving the first processed pattern-data array.

4. The signal processing circuit of claim 1 wherein the pattern-data array is pixel data of an image acquired from a camera.

5. The signal processing circuit of claim 4 wherein the feature detector is a face detector for detecting a face within an image of pixel data.

6. The signal processing circuit of claim 4 wherein the pattern-data array is color pixel data and wherein the second set includes a demosaicing perception-enhancing circuit.

7. The signal processing circuit of claim 4 wherein the second set of processor blocks includes a gamma correction perception-enhancing circuit.

8. The signal processing circuit of claim 1 wherein the first set of processor blocks includes color balance perception-enhancing circuit which is not included in the second set of processor blocks.

9. The signal processing circuit of claim 1 wherein the processor blocks include a scaling circuit operating when activated to provide a given downsampling of the pattern-data array before receipt by other processor blocks and;
   wherein the power management circuit activates the scaling circuit for the given downsampling only in the second mode.

10. The signal processing circuit of claim 1 wherein the feature detector provides a feature detection output that is a function of feature detection of successive frames of a video stream of pattern-data arrays.

11. A signal processing circuit comprising:
    an input for receiving an input pattern-data array having values and data order significance;
    a series of processor blocks processing a pattern-data array to provide improved human perception of the pattern-data array;
    a feature detector receiving a pattern-data array to identify a predetermined feature in the pattern-data array; and
    a power management circuit receiving a mode command and operating:
    (1) in a first mode to activate a first set of the processor blocks to process the input pattern-data array to provide a first processed pattern-data array for output on a human machine interface, the first processed pattern-data array offering improved human perception quality on the human machine interface over the input pattern-data array, and
    (2) in a second mode to activate a second set of the processor blocks different from the first set to process the input pattern-data array to provide a second processed pattern-data array for processing by the feature detector, the second processed pattern-data array offering reduced human perception quality on the human machine interface compared to the first processed pattern-data array, the second set of processor blocks consuming less power than the first set of processor blocks:
    wherein the processor blocks include an interpolation circuit operating to:
    (1) remove interpolatable data from the pattern-data array before receipt by other processor blocks; and
    (2) re-create the removed interpolatable data in output from the other processor blocks by interpolation of the output from the other processor blocks; and
    wherein the power management circuit activates the interpolation circuit as a function of being in the second mode.

12. The signal processing circuit of claim 11 wherein the interpolation system removes interpolatable data as a function of a difference in values of adjacent data to the interpolatable data.

13. The signal processing circuit of claim 11 wherein the power management circuit controls how much interpolatable data is removed.

14. The signal processing circuit of claim 11 wherein the interpolation circuit uses linear interpolation.

15. A signal processing circuit comprising:
    an input for receiving an input pattern-data array having values and data order significance;
    a series of processor blocks processing a pattern-data array to provide improved human perception of the pattern-data array;
    a feature detector receiving a pattern-data array to identify a predetermined feature in the pattern-data array; and
    a power management circuit receiving a mode command and operating:
    (1) in a first mode to activate a first set of the processor blocks to process the input pattern-data array to provide a first processed pattern-data array for output on a human machine interface, the first processed pattern-data array offering improved human perception quality on the human machine interface over the input pattern-data array, and (2) in a second mode to activate a second set of the processor blocks different from the first set to process the input pattern-data array to provide a second processed pattern-data array for processing by the feature detector, the second processed pattern-data array offering reduced human perception quality on the human machine interface compared to the first processed pattern-data array, the second set of processor blocks consuming less power than the first set of processor blocks wherein the feature detector is a supervised machine learning system having weights trained with a training set of pattern-data arrays processed by the second set of processor blocks.

16. A method of signal processing using a signal processing circuit having:

an input for receiving an input pattern-data array having values and data order significance;

a series of processor blocks processing a pattern-data array to provide improved human perception of the pattern-data array;

a feature detector receiving a pattern-data array to identify a predetermined feature in the pattern-data array; and a power management circuit receiving a mode command and operating:

(1) in a first mode to activate a first set of the processor blocks to process the input pattern-data array to provide a first processed pattern-data array for display on a human machine interface, the first processed pattern-data array offering improved human perception quality on the human machine interface over the input pattern-data array, and (2) in a second mode to activate a second set of the processor blocks different from the first set to process the input pattern-data array to provide a second processed pattern-data array for processing by the feature detector, the second processed pattern-data array offering reduced human perception quality on the human machine interface compared to the first processed pattern-data array, the second set of processor blocks consuming less power than the first set of processor blocks;

wherein the first and second set of processor blocks include perception-enhancing circuits enhancing the human perception quality of pattern-data arrays and wherein the first set of processor blocks activates more of the perception-enhancing circuits than the second set of processor blocks; and wherein the second set of processor blocks operating together provide better accuracy in the feature detector than would be provided by the process blocks excluded from the second set of processor blocks operating together;

the method comprising:

(a) operating the series of processor blocks in the second mode;

(b) upon detection of a feature by the feature detector, switching to the first mode.

17. The method of claim 16 wherein the processor blocks include an interpolation circuit operating to:

(1) remove interpolatable data from the pattern-data array before receipt by other processor blocks; and (2) re-create the removed interpolatable data in output from the other processor blocks by interpolation of the output from the other processor blocks; and wherein the power management circuit activates the interpolation circuit as a function of being in the second mode; and wherein at (a) further including the step of:

(i) activating the interpolation circuit to remove interpolatable data from the pattern-data array before receipt by other processor blocks; and (ii) activating the interpolation circuit to re-create the removed interpolatable data in output from the other processor blocks by interpolation of the output from the other processor blocks.

18. A signal processing circuit comprising:

an input for receiving an input pattern-data array having values and data order significance;

a series of processor blocks processing a pattern-data array to provide improved human perception of the pattern-data array;

a feature detector receiving a pattern-data array to identify a predetermined feature in the pattern-data array; and a power management circuit receiving a mode command and operating:

(1) in a first mode to activate a first set of the processor blocks to process the input pattern-data array to provide a first processed pattern-data array for output on a human machine interface, the first processed pattern-data array offering improved human perception quality on the human machine interface over the input pattern-data array, and (2) in a second mode to activate a second set of the processor blocks different from the first set to process the input pattern-data array to provide a second processed pattern-data array for processing by the feature detector, the second processed pattern-data array offering reduced human perception quality on the human machine interface compared to the first processed pattern-data array, the second set of processor blocks consuming less power than the first set of processor blocks;

wherein the first set of processor blocks includes at least one of gamma correction and demosaicing and the at least one of white balance, color balance, and geometric correction, and wherein the second set of processor blocks includes at least one of gamma correction and demosaicing and excludes at least one of white balance, color balance and geometric correction.

* * * * *